(12) United States Patent
Coursol et al.

(10) Patent No.: US 10,337,083 B2
(45) Date of Patent: Jul. 2, 2019

(54) PROCESSES FOR PREPARING VARIOUS METALS AND DERIVATIVES THEREOF FROM COPPER- AND SULFUR-CONTAINING MATERIAL

(71) Applicant: 5N PLUS INC., Montréal (CA)

(72) Inventors: Pascal Coursol, Montréal (CA); Wu Shijun, Montréal (CA)

(73) Assignee: 5N PLUS INC., Montréal (CA)

( * ) Notice: Subject to any disclaimer, the term of this patent is extended or adjusted under 35 U.S.C. 154(b) by 0 days.

(21) Appl. No.: 15/754,899

(22) PCT Filed: Aug. 19, 2016

(86) PCT No.: PCT/CA2016/050972
§ 371 (c)(1),
(2) Date: Feb. 23, 2018

(87) PCT Pub. No.: WO2017/031574
PCT Pub. Date: Mar. 2, 2017

(65) Prior Publication Data
US 2018/0251873 A1    Sep. 6, 2018

Related U.S. Application Data

(60) Provisional application No. 62/250,056, filed on Nov. 3, 2015, provisional application No. 62/208,993, filed on Aug. 24, 2015.

(51) Int. Cl.
*C22B 15/02* (2006.01)
*C22B 15/00* (2006.01)
(Continued)

(52) U.S. Cl.
CPC .......... *C22B 15/0032* (2013.01); *C22B 7/001* (2013.01); *C22B 7/02* (2013.01);
(Continued)

(58) Field of Classification Search
CPC ............ C22B 15/0032; C22B 15/0028; C22B 15/005; C22B 15/0054; C22B 15/0095;
(Continued)

(56) References Cited

U.S. PATENT DOCUMENTS 2,889,196 A * 6/1959 Lebedeff ............... C22B 15/006
423/562
3,849,120 A 11/1974 Norman
(Continued)

FOREIGN PATENT DOCUMENTS

CA       1017151      9/1977
CA       1294131      1/1992
(Continued)

OTHER PUBLICATIONS

CN103114206 Machine Translation (Year: 2013).*
(Continued)

*Primary Examiner* — Tima M. McGuthry-Banks
(74) *Attorney, Agent, or Firm* — Bereskin & Parr LLP/S.E.N.C.R.L., s.r.l.

(57) ABSTRACT

The processes can comprise feeding a furnace with a raw material. These materials can contain impurities and valuable metals (base metals, precious metals, platinum group metals, minor metals). The processes can allow the volatilization of arsenic and indium contained therein. Before volatilizing the material, composition of the material is optionally modified so as to obtain a ratio % S/(% (Cu/2)+% Ni+% Co) of about 0.5 to about 2. The processes can comprise feeding a melting device with the depleted material, and with a source of carbon in order to obtain a multi-layer product and an off gas. Before melting the depleted material, the depleted material composition is optionally modified so as to obtain a ratio % S/(% (Cu/2)+% Ni+% Co) of about 0.5 to about 2. Thus, it is possible to (Continued)

recover Cu, Ni and Co as well as several other metals, including In, Ge, Pb, Bi, precious metals and platinum group metals.

24 Claims, 5 Drawing Sheets

(51) Int. Cl.
*C22B 7/00* (2006.01)
*C22B 7/02* (2006.01)
*C22B 9/10* (2006.01)
*C22B 23/02* (2006.01)
*C22B 30/00* (2006.01)
*C22B 41/00* (2006.01)

(52) U.S. Cl.
CPC ............ *C22B 9/10* (2013.01); *C22B 15/0002* (2013.01); *C22B 15/005* (2013.01); *C22B 15/0028* (2013.01); *C22B 15/0054* (2013.01); *C22B 15/0095* (2013.01); *C22B 15/0097* (2013.01); *C22B 23/02* (2013.01); *C22B 30/00* (2013.01); *C22B 41/00* (2013.01); *Y02P 10/214* (2015.11)

(58) Field of Classification Search
CPC ... C22B 15/0097; C22B 15/0002; C22B 7/02; C22B 9/10; C22B 23/025; C22B 1/00
See application file for complete search history.

(56) References Cited

U.S. PATENT DOCUMENTS

| | | | |
|---|---|---|---|
| 4,006,010 A | 2/1977 | Rajcevic et al. | |
| 4,144,055 A | 3/1979 | Petersson et al. | |
| 4,162,915 A * | 7/1979 | Maes | C22B 5/02 75/10.29 |
| 4,169,725 A | 10/1979 | Makipirtti | |
| 4,614,541 A | 9/1986 | Berndt et al. | |
| 4,758,268 A | 7/1988 | Bishop et al. | |
| 4,831,943 A | 5/1989 | Aune | |
| 5,282,881 A | 2/1994 | Baldock et al. | |
| 5,496,392 A | 3/1996 | Sims et al. | |
| 5,554,207 A | 9/1996 | Bogdan et al. | |
| 5,906,671 A | 5/1999 | Weinwurm et al. | |
| 6,245,123 B1 | 6/2001 | Edlinger | |
| 9,725,784 B2 | 8/2017 | McHugh et al. | |
| 2015/0122082 A1 | 5/2015 | Metsarinta et al. | |

FOREIGN PATENT DOCUMENTS

| | | | |
|---|---|---|---|
| CA | 2075794 | | 2/1994 |
| CN | 1566379 | * | 1/2005 |
| CN | 103114206 | * | 5/2013 |
| CN | 103215463 | | 7/2013 |
| CN | 104004918 | | 8/2014 |
| GB | 1537470 | * | 12/1978 |
| GB | 2196649 | | 5/1988 |
| RU | 2441081 | | 1/2012 |

OTHER PUBLICATIONS

CN1566379 Machine Translation (Year: 2005).*
Shibayama, Atsushi, et al. "Treatment of smelting residue for arsenic removal and recovery of copper using pyro-hydrometallurgical process." Journal of Hazardous Materials. vol. 181 pp. 1016-1023. doi:10.1016/j.jhazmat.2010.05.116 (Year: 2010).*
Agrawal et al., "Solid Waste management in non-ferrous industries in India", Resources, Conservation and Recycling, vol. 42, Issue 2, Sep. 2004, pp. 99-120.
Atsushi et al, "Treatment of smelting residue for arsenic removal and recovery of copper using pyro-hydrometallurgical process", Journal of Hazardous Materials, vol. 181, Issues 1-3, Sep. 15, 2010, pp. 1016-1023.
English Abstract of CN101787434(A), "Method for recovering iron and tin-lead-zinc from magnetic separation waste residue by rotary kiln through deoxygenation, chloridization and oxidation", published on Jul. 28, 2010.
English Abstract of DE4030554(A1), "Procedure and device for thermal treatment of waste materials—comprises reactor combustion zone charged with waste, coke and lime, and gas produced passes through hot coke be also located in reactor", published on Apr. 9, 1992.
English Abstract of JP2009209405(A), "Method for smelting copper-containing dross", published on Sep. 17, 2009.
English Translation—Machine Translation of CN1566379, "Copper-zinc separation method during smelting in a blast furnace", published on Jan. 19, 2005.
English Translation—Machine Translation of CN103114206A, "Method and device for recovering valuable elements from lead-silver-bismuth slag in copper smelting", published on May 22, 2013.
English Translation—Machine Translation of CN104004918(A), "Method for collocation of kiln slag with copper blast furnace", published on Aug. 27, 2014.
English Translation—Machine Translation of RU2441081, "Method of pyrometallurgical processing of copper-containing materials", published on Jan. 27, 2012.
John Perry Walker, "Scheme for the treatment of copper smelter flue dust", Materials Science and Engineering, Missouri School of Mines and Metallurgy, 1911. (The year of publication is sufficiently earlier than the effective U.S. filing date so that the particular month of publication is not an issue).
Montenegro et al., "Recirculation of high arsenic content copper smelting dust to smelting and converting processes", Minerals Engineering, vol. 49, Aug. 2013, pp. 184-189.
M. Shamsuddin, "Metal Recovery from Scrap and Waste", JOM, Feb. 1986, vol. 38, Issue 2, pp. 24.
English Translation—Machine Translation of CN103215463(A), "Method for decomposing bastnaesite through calcification transformation-leaching", published on Jul. 24, 2013.

* cited by examiner

PROCESSES FOR PREPARING VARIOUS METALS AND DERIVATIVES THEREOF FROM COPPER- AND SULFUR-CONTAINING MATERIAL

CROSS-REFERENCE TO RELATED APPLICATIONS

The present application is a 35 USC 371 national stage entry of PCT/CA2016/050972 filed on Aug. 19, 2016 and which claims priority from U.S. provisional application Nos. 62/208,993 filed on Aug. 24, 2015 and 62/250,056 filed on Nov. 3, 2015. These documents are hereby incorporated herein by reference in their entirety.

TECHNICAL FIELD

The present disclosure relates to improvements in the field of chemistry applied to the extraction and recycling of metals, alloys and various derivatives thereof. For example, the present disclosure relates to processes for the treatment of various raw materials or residues generated during mining, metallurgical and/or industrial processes.

BACKGROUND OF THE DISCLOSURE

While hydrometallurgical and mineral processing approaches became substantially more competitive in the last decades, materials containing multiple elements can often be challenging to process with these methods, leading to high operating costs. As an example, many attempts were made to recycle smelter dust hydrometallurgically to recover minor elements, such as Cu, Pb, Sb, Bi, Ag, Au, Ge and In. Such processes generally resulted in complicated flow sheets (water balance, chloride limits, heat balance, water contamination, operating costs, etc.).

There is thus a need for at least providing an alternative or complementary technology to the existing solutions for treating such dust residues and/or other polymetallic raw materials.

SUMMARY OF THE DISCLOSURE

According to one aspect, there is provided a process for preparing various metals and derivatives thereof, the process comprising:
  feeding a blast furnace or optionally another melting device with copper-containing briquettes having a ratio (2*%)/(% Cu) of about 0.5 to about 2.0 and a source of carbon in order to obtain a multi-layer product and an off gas;
  optionally controlling presence or absence of a speiss layer in the multi-layer product; and
  optionally feeding the blast furnace with an iron source, wherein the obtained product optionally comprises:
    a first layer disposed at the top of the multi-layer product, the first layer comprising slag;
    a second layer, disposed below the first layer, and that comprises matte;
    optionally a speiss layer disposed below the second layer, and
    optionally a bottom layer disposed below the second layer or the speiss layer and comprising an alloy of at least two metals.

According to another aspect, there is provided a process for preparing various metals and derivatives thereof, the process comprising:
  feeding a furnace with a copper-containing material (for example pellets or briquettes) so as to volatilize at least partially at least one of arsenic and indium contained therein, thereby obtaining a material at least partially depleted in at least one of arsenic and indium, wherein before volatilizing the material, composition of the material is optionally modified so as to obtain a ratio (2*% S)/(% Cu) of about 0.5 to about 2.0;
  feeding a melting device with the depleted material, and with a source of carbon in order to obtain a multi-layer product and an off gas, wherein before melting the depleted material, the depleted material composition is optionally modified so as to obtain a ratio 2*% S/(% Cu) of about 0.5 to about 2.0;
  wherein the process optionally comprises at least one of
    modifying composition of the material before volatilizing so as to obtain a ratio 2*% S/(% Cu) of about 0.5 to about 2.0; and
    modifying composition of the depleted material before melting so as to obtain a ratio (2*% S)/(% Cu) of about 0.5 to about 2.0.

According to another aspect, there is provided a process for preparing various metals and derivatives thereof, the process comprising:
  feeding a blast furnace or optionally another melting device with:
    briquettes comprising (i) a raw material that is chosen from a copper-containing material, a nickel-containing material, a cobalt-containing material and mixtures thereof, the briquettes having a ratio % S/((% Cu/2)+% Ni+% Co) of about 0.5 to about 2;
    and with a source of carbon in order to obtain a multi-layer product and an off gas;
  optionally controlling presence or absence of a speiss layer in the multi-layer product; and
  optionally feeding the blast furnace with an iron source, wherein the obtained product optionally comprises:
    a first layer disposed at top of the multi-layer product, the first layer comprising slag;
    a second layer, disposed below the first layer, and that comprises matte;
    optionally a speiss layer disposed below the second layer; and
    optionally a bottom layer disposed below the second layer or the speiss layer and comprising an alloy of at least two metals.

According to another aspect, there is provided a process for preparing various metals and derivatives thereof, the process comprising:
  feeding a furnace with a raw material chosen from a copper-containing material, a nickel-containing material, a cobalt-containing material and mixtures thereof (for example briquettes) so as to volatilize at least partially at least one of arsenic and indium contained therein, thereby obtaining a material at least partially depleted in at least one of arsenic and indium, wherein before volatilizing the material, composition of the material is optionally modified so as to obtain a ratio % S/(% (Cu/2)+% Ni+% Co) of about 0.5 to about 2; and
  feeding a melting device with the depleted material, and with a source of carbon in order to obtain a multi-layer product and an off gas, wherein before melting the depleted material, the depleted material composition is optionally modified so as to obtain a ratio % S/(% (Cu/2)+% Ni+% Co) of about 0.5 to about 2;

wherein the process comprises at least one of
modifying composition of the material before volatilizing so as to obtain a ratio % S/((% Cu/2)+% Ni+% Co) of about 0.5 to about 2; and
modifying composition of the depleted material before melting so as to obtain a ratio % S/((% Cu/2)+% Ni+% Co) of about 0.5 to about 2.

BRIEF DESCRIPTION OF DRAWINGS

In the following drawings, which represent by way of example only, various embodiments of the disclosure.

DETAILED DESCRIPTION OF VARIOUS EMBODIMENTS

Figure 1:
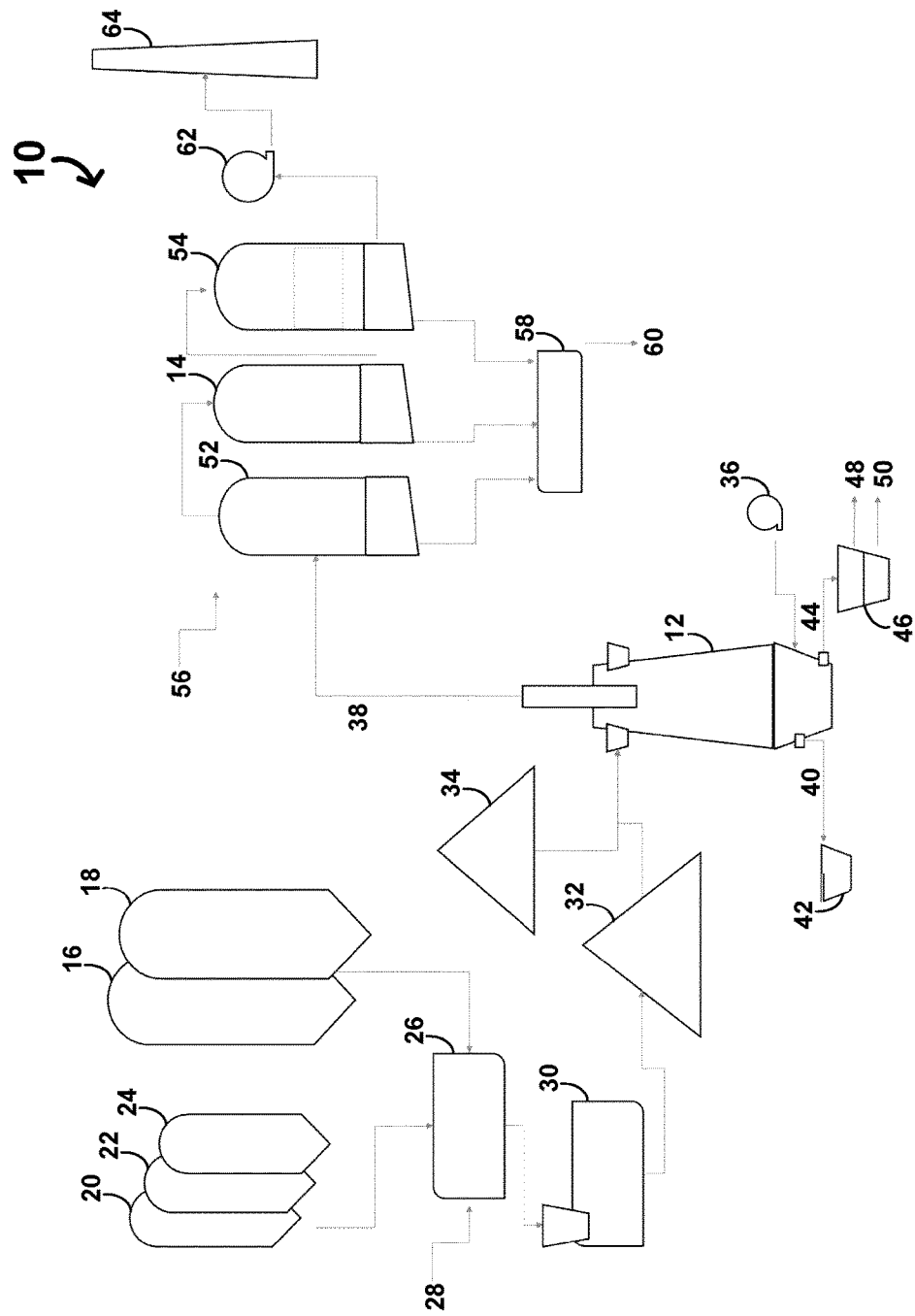
FIG. 1 shows a block diagram of an example of a process according to the present disclosure.

Further features and advantages will become more readily apparent from the following description of various embodiments as illustrated by way of examples only and in a non-limitative manner.

The term "briquettes" as used herein refers to compacted particles that can optionally comprise a binder. Such an expression as used herein covers briquettes as well as other shapes or forms of compacted and/or densified material mixtures or particles such as pellets, sinters, agglomerates, and bricks which can be produced with or without compaction and/or treatment at a temperature higher than ambient temperature.

The expression "raw material" as used herein refers to a starting material that can be used in the processes of the present disclosure. For example, such a starting material can be a waste material, an industrial waste material, or an industrial by-product. For example, the raw material can be either hazardous or non-hazardous or mixtures thereof. For example, the raw material can be chosen from a smelter dust, a leach residue, ash, slag, concentrate, slurries, flotation concentrate, slag concentrate, catalyst, oxides, end-of-life products or mixtures thereof. For example, the raw material can comprise at least one metal chosen from Pb, Cu, Ni and Co.

The expression "speiss layer" as used herein refers to a molten layer which mainly comprises As, Sb, Fe, Cu, Co and Ni. For example, the speiss layer can also comprise sulfur (e.g. sulfur can be in smaller amounts).

For example, the furnace can be a shaft furnace, a blast furnace, a sintering device, a rotary kiln or a fluidized bed.

For example, the furnace can be a sintering device, a rotary kiln or a fluidized bed.

For example, the furnace can be a shaft furnace, a rotary kiln, a sintering device or a fluidized bed.

For example, the furnace can be a shaft furnace.

For example, the furnace can be a blast furnace.

For example, the furnace can be a rotary kiln.

For example, the furnace can be a fluidized bed or a sintering device.

For example, the furnace can be a blast furnace.

For example, the melting device can be an electric furnace, a blast furnace, a reverberatory furnace or a rotary furnace.

For example, the process can comprise controlling presence or absence of a speiss layer in the multi-layer product.

For example, the obtained product can comprise:
a first layer disposed at top of the multi-layer product, the first layer comprising slag;
a second layer, disposed below the first layer, and that comprises matte;
optionally a speiss layer disposed below the second layer; and
optionally a bottom layer disposed below the second layer or the speiss layer and comprising an alloy of at least two metals.

For example, the obtained product can comprise:
a first layer disposed at top of the multi-layer product, the first layer comprising slag;
a second layer, disposed below the first layer, and that comprises matte;
optionally a speiss layer disposed below the second layer; and
optionally a bottom layer disposed below the second layer or the speiss layer and comprising an alloy of at least two metals chosen from Pb, Bi, Ag, Au, and Sb.

For example, the briquettes can comprise a fluxing agent.

For example, the fluxing agent can comprise silica, iron oxide and/or calcium oxide.

For example, the briquettes can comprise at least one additive chosen from a source of sulfur and a source of iron.

For example, the briquettes can be obtained by mixing and briquetting a copper-containing material together with an ingredient chosen from a sulfur source (such as elemental sulfur, sulfides and sulfates), a fluxing agent, a source of calcium oxide, a source of iron oxide, $SiO_2$, and mixtures thereof. For example, the briquettes can be obtained by mixing and briquetting a copper-containing material together with an ingredient chosen from a sulfur source, a fluxing agent, a source of calcium oxide, a source of iron or iron oxide, $SiO_2$, and mixtures thereof. For example, the briquettes can be obtained by mixing and briquetting a copper-containing material, a nickel-containing material, a cobalt-containing material and mixtures thereof, together with an ingredient chosen from a sulfur source, a fluxing agent, a source of calcium oxide, a source of iron, $SiO_2$, and mixtures thereof.

For example, the source of carbon can be effective for use as a reducing agent and/or for providing a thermal balance of the furnace.

For example, the source of carbon can be chosen from coal, coke and a mixture thereof. For example, the source of carbon can be chosen from activated carbon, coke breeze, carbon or pet coke, diesel, natural gas and other hydrocarbons (such as propane, ethane, ethanol, methanol and pitch) and mixtures thereof.

For example, the process can comprise feeding the blast furnace with an iron source.

For example, the iron source can be iron oxide.

For example, the process can comprise feeding the blast furnace with a source of metallic iron ($Fe^0$).

For example, the process can comprise controlling composition of the second layer.

For example, the process can comprise controlling sulfur content of the second layer and feeding the blast furnace with the iron source if the sulfur content is over a predetermined value, leading to a given metallization level for the second layer.

For example, the process can further comprise at least substantially separating the layers of the multi-layer product from one another.

For example, the first layer can comprise an iron oxide and/or calcium oxide and silica. For example, the first layer can comprise an iron oxide and/or a copper oxide.

For example, the first layer can comprise at least one of an iron oxide, a copper oxide, a nickel oxide and cobalt oxide.

For example, the second layer can comprise Cu, Fe, Pb, S or mixtures thereof.

For example, the second layer can comprise Cu—Fe—Pb—S. For example, the second layer can comprise a mixture of Cu—Fe—Pb—S.

For example, the second layer can comprise Cu—Ni—Co—Fe—S.

For example, the second layer can comprise Cu.

For example, the second layer can comprise Ni.

For example, the second layer can comprise Co.

For example, the speiss layer can comprise Fe and As.

For example, the speiss layer can comprise Fe, As and Ge.

For example, the speiss layer can comprise Cu, Fe, As and Ge.

For example, the speiss layer can comprise Fe, As and Ge and the process can further comprise recovering Ge from the speiss layer.

For example, the speiss layer can comprise Fe, As and Ge and the process can further comprise recovering Ge from the speiss layer by at least one chemical or physical technique.

For example, the speiss layer can comprise Ni.

For example, the speiss layer can comprise Co.

For example, the speiss layer can comprise Cu, Ni and Co and the process can further comprise recovering Cu, Ni and Co from the speiss layer.

For example, the speiss layer can comprise Cu, Ni and Co and the process can further comprise recovering Cu, Ni and Co from the speiss layer by at least one chemical or physical technique.

For example, the speiss layer can comprise at least 30% by weight of iron.

For example, the speiss layer can comprise about 55% to about 75% by weight of iron.

For example, the speiss layer can comprise about 55% to about 90% by weight of iron.

For example, the speiss layer can comprise at least 30% by weight of (Fe+Ni+Co).

For example, the speiss layer can comprise about 55% to about 90% by weight of (Fe+Ni+Co).

For example, the bottom layer can comprise an alloy of at least two metals chosen from Pb, Bi, Ag, Au, and Sb.

For example, the bottom layer can comprise an alloy of at least two metals chosen from Pb, Bi, Ag, Au, Pt and Sb.

For example, the off gas can comprise As.

For example, the off gas can comprise In.

For example, the off gas can comprise As and optionally Ge.

For example, the process can comprise using an air intake in an upper portion of a shaft of the blast furnace, thereby minimizing fugitive emissions while charging the furnace.

For example, the process can comprise fuming at least one of As, In, Ge and Sb in an upper part of a shaft of the blast furnace for further recovery/stabilization from the furnace off gas.

For example, the briquettes can comprise a copper-containing material. For example, the briquettes can comprise a nickel-containing material. For example, the briquettes can comprise a cobalt-containing material.

For example, the copper-containing briquettes can comprise a copper-containing material.

For example, the copper-containing material can be a copper concentrate, a smelter dust, a leached smelter dust, a leach residue, a roaster dust, or mixtures thereof.

For example, the copper-containing material can be copper containing slag, metallic alloy containing copper, a copper concentrate, a smelter dust, a leached smelter dust, a leach residue, a roaster dust, spent catalyst, copper containing industrial by-products, production waste containing copper, an end of life product or mixtures thereof.

For example, the copper-containing material can further comprise nickel and/or cobalt in the form of a slag, a metallic alloy, a concentrate, a smelter dust, a leached smelter dust, a leach residue, a roaster dust, spent catalyst, industrial by-products, production waste, an end of life product or mixtures thereof.

For example, the nickel-containing material can be nickel containing slag, metallic alloy containing nickel, a nickel concentrate, smelter dust containing nickel, spent catalyst, nickel containing industrial by-products, production waste containing nickel an end of life product or mixtures thereof.

For example, the cobalt-containing material can be a cobalt containing slag, metallic alloy containing cobalt, a cobalt concentrate, smelter dust containing cobalt, spent catalyst, cobalt containing industrial by-products, production waste containing cobalt, an end of life product or mixtures thereof.

The following examples are non-limitative.

EXAMPLE 1

The process as shown in FIG. 1 can be used, for example, by plants that undergo processes to recover copper and other valuable metals from a leach residue while removing a substantial amount of the arsenic contained in the source materials. Once it is leached in a hydrometallurgical circuit to remove most of the copper and arsenic, it becomes a leach residue containing several metals (Ag, Cu, Au, Ge, Pb, Bi, etc.).

An example of the composition is presented in Table 1.

TABLE 1

| Sample Composition - Example 1 | |
|---|---|
| As | 1-5% |
| Ag | 500-1000 ppm |
| Ge | 500-1000 ppm |
| Pb | 10-20% |
| Bi | 1-3% |
| Cu | 5-10% |
| $SiO_2$ | 15-25% |
| Zn | 0-5% |
| Fe | 8-15% |
| S | 8-14% |

A general process 10 for treating these kind of residues in the present example is shown in FIG. 1. The processing line includes equipment/processes classified in three areas described in greater detail below: materials handling and briquetting, a furnace area and a gas cleaning area.

The arsenic volatilized in the blast furnace 12 and captured in the scrubber 14 solution can be stabilized in a $CaSO_4$-scorodite mixture or in an alternative product, such as calcium arsenite/arsenates of arsenic ferrihydrite and basic calcium arsenite/arsenate. Portland cement or other additives can also be added to the arsenic residue to enhance its stability.

1-Handling and Briquetting Area

Handling of residues containing high levels of arsenic could require enclosed or well-ventilated handling systems until the residues are blended with water and other components. Areas of the plant used for handling and briquetting can be equipped with secondary ventilation to ensure proper hygiene conditions in the blending area. For example, additives (e.g. a CaO source and an iron source such as iron ore) can be mixed with the leach residues prior to being processed in a blast furnace.

Separate bins can be provided for the storage of the material of Example 1 or the dust of Example 2 (16, 18), iron ore and CaO/$CaCO_3$ (additives storage 20, 22, 24). Each bin (16, 18, 20, 22, 24) can comprise appropriate materials and peripheral transportation systems, taking into consideration materials with specific physical and chemical properties. Sealed feed screws and pneumatic systems can be considered.

Different mixing systems and screw conveyors may be used for slurry transportation. For example, slurry pumps may be used to convey the feed/water paste into the blender unit 26, wherein water 28 can be mixed in.

Briquetting can be used for the compaction of granular material. A roller press, block machine or other similar equipment 30 can be used for this purpose. Feedstock/additives can be compacted to a defined form and size, enabling it to be used in subsequent production steps. Some porosity can be provided in the final briquettes 32 to allow gas release during the heating of the briquettes 32, for example $CO_2$ from carbonate decomposition, sulfate decomposition or arsenic-oxide evaporation in the shaft of the blast furnace.

In some embodiments, a block making machine is used for the briquetting. This means of briquetting is simple and requires a modest capital investment. For example, the machine can be enclosed in a ventilated area to avoid the presence in the work place of fine dust.

Once briquettes 32 are produced, they can be dried/cured. For example, three days or less can be used for this step depending, for example, on the drying rate. The skilled person would appreciated that site conditions and equipment used (if any), may significantly impact the drying rate.

The desired amounts of feed, additives and water 28 can be fed to the mixing unit 26. The briquetting machine 30 can be fed with a wet mixture comprising approximately about 10 to about 20% humidity, depending on the briquetting technology selected. The skilled person can select a suitable humidity based on the selected briquetting technology. Once dried and cured, briquettes 32 can have a final humidity level of about 1 to about 8%.

2-Furnace Area

2.1 Feed to Smelting Unit

Figure 2:
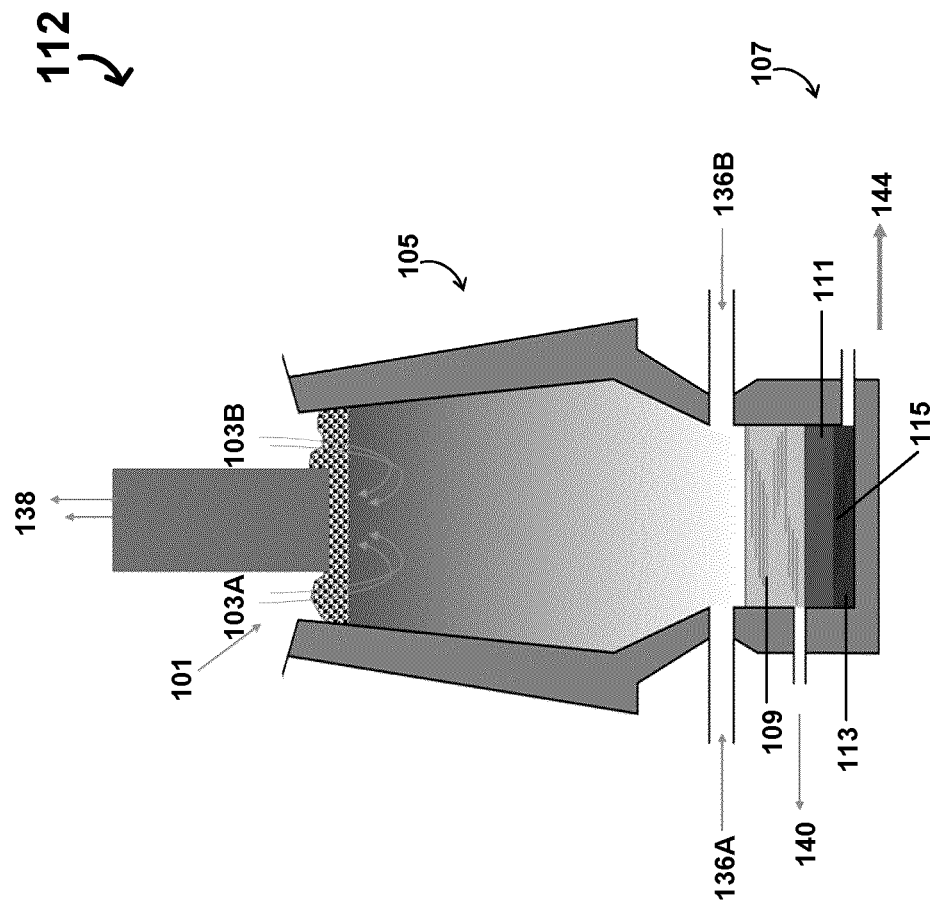
FIG. 2 shows a block diagram of another example of a process according to the present disclosure.

The blast furnace 12 of FIG. 1 is shown in greater detail in the furnace schematic shown in FIG. 2. Components of FIG. 2 generally similar to the components described with reference to FIG. 1 are identified with like reference numerals prefixed with a numeral 1. As shown in FIG. 2, the blast furnace 112 can be fed from the top through a feedport 101 with successive layers of coke and briquettes (FIG. 1: 34, 32, respectively). Process air (FIG. 1: 36; FIG. 2: 136A, 136B) can be injected at the bottom of the furnace (FIG. 1: 12, FIG. 2: 112) at relatively high volume (i.e. high pressure). The off gas (FIG. 1: 38; FIG. 2: 138) can be extracted at the top of the furnace (FIG. 1: 12; FIG. 2: 112). This off gas (FIG. 1: 38; FIG. 2: 138) can include, for example, the process gas, and the infiltration air (FIG. 2: 103A, 103B), which can be significant in volume. As shown in FIG. 2, an "open" furnace feedport 101 can be used due to the high air intake 103A, 103B by this feedport 101. The air infiltration 103A, 103B is significantly higher in volume compared to the process air (FIG. 1: 36; FIG. 2: 136A, 136B). This infiltration air (FIG. 2: 103A, 103B) is used to advance combustion of some CO left from the process gas and also for cooling the gas to an appropriate temperature by dilution.

2.2 Smelting Unit

Referring to FIG. 2, feed briquettes (not shown) can be melted in the blast furnace 112 with furnace coke (not shown) to provide the heat source and reducing conditions in the shaft 105. As melting occurs, briquettes melt in the furnace 112 and sink to the bottom part of the furnace (crucible 107). Several immiscible layers can be formed in the furnace 112, the upper layer or top layer can be a slag 109 comprising CaO—FeO—$SiO_2$—$Fe_2O_3$—$Na_2O$, etc. A "matte" layer 111 also forms, just under the slag layer 109, and can comprise copper sulfides, iron sulfides and lead sulfide. Finally, a third layer 113 can comprise metallic lead and bismuth with most of the silver and gold "metal alloy". The slag 109 can be tapped (FIG. 1: 40; FIG. 2: 140) separately and can be directed to dump or floatation 42, and the matte 111 and the metal 113 phases can be tapped (FIG. 1: 44, FIG. 2: 144) together. Referring to FIG. 1, the latter can separate in the molds 46 after the matte layer 48 (which can be directed to smelting) has solidified over the still liquid metallic layer (metal alloy 50).

2.3 First Basic Principles—Volatilization

As, In, and some Pb, Bi volatilize at high temperature.

Low $p(O_2)$ and high $p(S_2)$ can also help this volatilization for given minor elements. Depending on conditions selected, some elements will remain in condensed phase or leave with the furnace gas.

For example, the process can be operated with either neutral, controlled reducing conditions or excess sulfur ($FeS_2$, $S_2$, etc.) to volatilize a greater fraction of arsenic, antimony and bismuth.

If desirable, the addition of metallic components in the right form or excessive reduction can reduce volatilization of arsenic and antimony, by forming speiss components. Referring to FIG. 2, this speiss layer 115 is generally located between the matte layer 111 and the metallic layer 113.

Many sulfates are decomposed at low temperature under reducing conditions (for example under 800° C.). Under neutral or mildly reducing conditions, $As_2O_5$ (in $FeAsO_4$, for example) will decompose under about 900° C. providing less arsenic in the calcined material.

Figure 3:
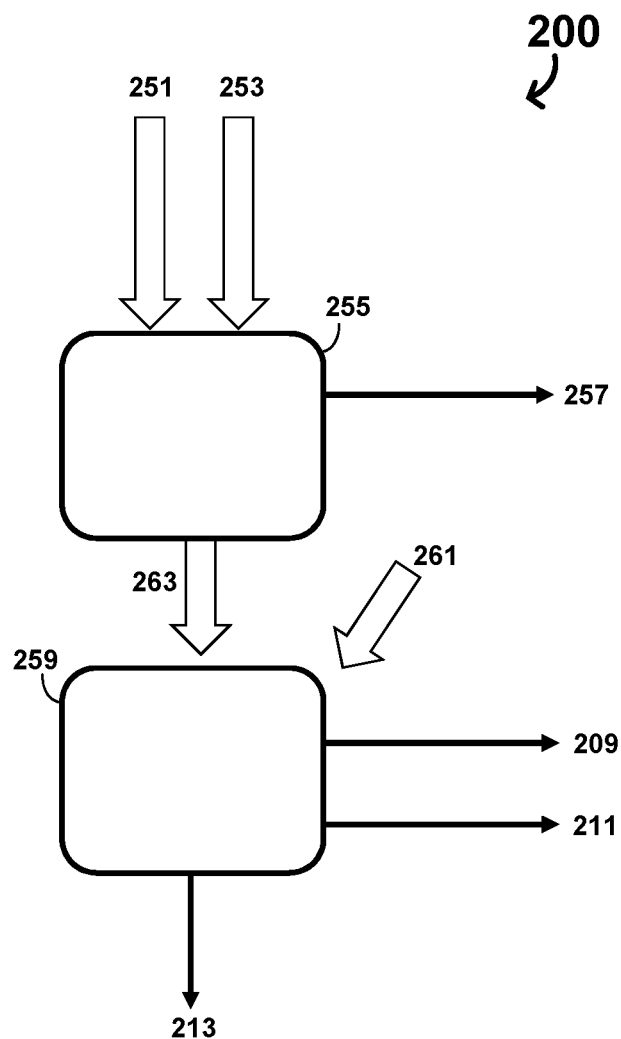
FIG. 3 shows a block diagram of another example of a process according to the present disclosure.

Some sulfides or even elemental sulfur contained in the feed/additives promote the volatilization of certain elements. For example, as shown in FIG. 3, in an example of the process 200, heat treatment of residues 251 (or dust; see: Example 2) and additives 253 under appropriate conditions (e.g. controlled temperature and pressure 255) can fume 257 In, Sb, As, Bi and other volatiles. For example, As, and Sb sulfides are volatile (several volatile species exist). Bi sulfides are also volatile to a certain extent. Other minor elements can be volatilized when $p(S_2)$ is adjusted in the system. For example, smelting can be carried out under specific conditions (e.g. controlled $p(S_2)$ and metallization 259. This can be achieved, for example, by adding 261 sulfur, $FeS_2$, FeS or a small amount of concentrate to the furnace feed. Other sulfur additives may also be added 261. Components of FIG. 3 generally similar to the components described with reference to other figures are identified with like reference numerals prefixed with a numeral 2.

2.4 Basic Principles—Metallization

Metallic elements in the furnace can be produced either by the reduction of metal oxides or by the addition of metals to the furnace (Fe or Cu for example). Sulfur (added or present in the feed) will combine with available metals in the following sequence at high temperature:

Fe+S=FeS (matte)

2Cu+S=Cu$_2$S (matte)

Pb+S=PbS (matte)

2Bi+3S=Bi$_2$S$_3$ (matte)

2Ag+S=Ag$_2$S (matte)

Referring again to FIG. 3, regarding the non-volatile components 263, adjustment of the total metallic elements and sulfur in the furnace feed material can allow for having most Cu reporting to matte 211. The iron ore addition in the furnace can serve two purposes: allow a fluid slag 209 to be obtained at the operating temperature, but also for sulfur sequestration purposes. With this approach of controlling the metallization in the system, the Pb, Bi, Ag and Au components can remain in the metallic phase 213, i.e. for example if there is not enough sulfur for them, they will settle in the metallic phase 213. In an embodiment of the process 200, the matte 211, slag 209 and metal 213 can be separated and recycled using appropriate processes.

When thermal and chemical conditions are set in a proper way, an advantageous deportment can be obtained between the metal, the speiss, the matte, the slag and the gaseous phase.

Figure 4:
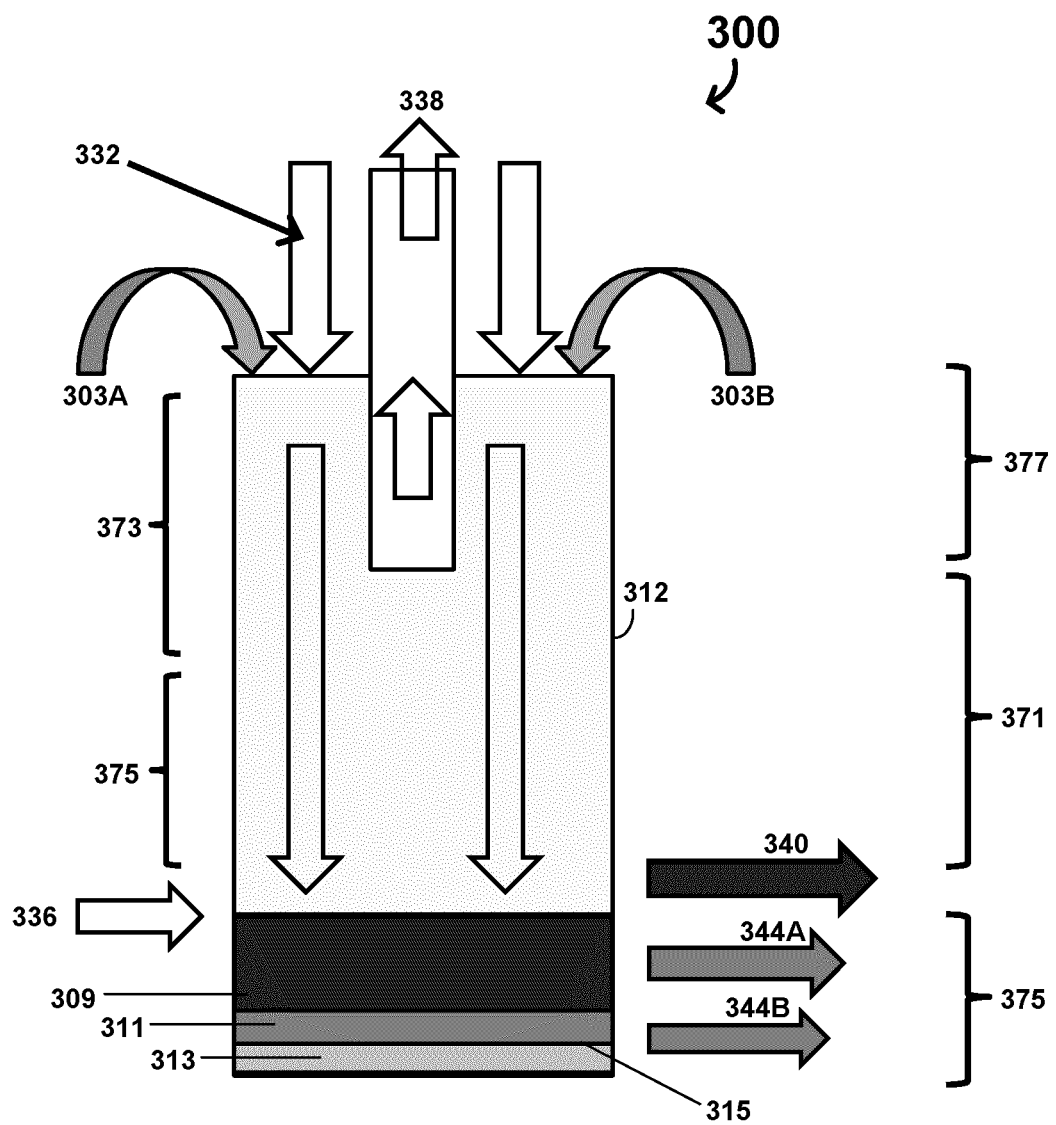
FIG. 4 shows a block diagram of another example of a process according to the present disclosure.

FIG. 4 depicts in greater detail, an example 300 of what happens in the different levels of the shaft furnace (FIG. 1: 12; FIG. 2: 112; FIG. 4: 312) while processing the dried briquettes (FIG. 1: 32; FIG. 4: 332) made of leach residue (or dust; see: Example 2) and additives. Components of FIG. 4 generally similar to the components described with reference to other figures are identified with like reference numerals prefixed with a numeral 3. As shown in FIG. 4, the tuyere air (injected air 336) can react with the coke bed in the lower part 371 of the furnace 312, thereby providing reduction conditions and the heat required to maintain the furnace thermal balance. The slag 309 temperature can be between 1100 and 1350° C. while the copper matte 311 and the metal 313 layer can be at a slightly lower temperature due to heat losses of the furnace crucible. The furnace 312 can be tapped at a given frequency depending on feed rate and chemical composition of the feed materials (charge). Slag 309 can be tapped 340 more regularly while the matte 311 and metal 313 phases are tapped separately (344A, 344B) or together (not shown) at a reduced frequency. For example, four products can be obtained from the furnace 312: furnace slag 309; furnace matte 311 for smelting or selling as a commercial product; furnace alloy (metal 313; high in lead, bismuth and silver and containing most of the gold); and process off gas (containing dust; shown in FIG. 4 as volatiles and entrained materials 338) to the gas cleaning system. Optionally a fifth product (speiss 315) is obtained at the metal 313 matte 311 interface.

Referring still to FIG. 4, the process employs negative pressure, air infiltration (303A, 303B). Heat treatment 373 is conducted under appropriate conditions to fume As, Sb and other volatiles as described in greater detail with reference to FIG. 3. Smelting 375 under specific conditions is conducted to separate Pb, Bi, Ag, Cu, etc. The schematic in FIG. 4 shows regions of: oxidative conditions and low temperature 377; reducing conditions (CO) and increasing temperature 371; and metalized conditions and high temperature 375.

3-Gas Cleaning Systems

A main fan can draw the process and infiltration gases from the furnace. For example, all process gas exiting the furnace (500-700° C.) can be cleaned using a high efficiency wet scrubbing system.

Different gas cleaning systems can be considered. Some examples are below:

Combined: Heat Exchanger+Bag House+Wet Scrubbing system.

2 Wet Steps: Quench Tower+Scrubbing Tower.

3 Wet Steps: Quench Tower+Scrubbing Tower+Wet Electric Precipitators.

Returning to FIG. 1, in the example 10 shown therein, the off gas 38 travels to the gas cleaning system which comprises a quench tower 52, the scrubber/scrubbing tower 14 and a wet precipitator 54. Water 56 is used into the gas cleaning system. Solids and solutions 58 from the gas cleaning system are directed for further treatment 60. A blower 62 draws clean gas stream from the system to the stack 64.

EXAMPLE 2

The present example is similar to the process described in Example 1 and is shown in FIG. 1. In this case, a dust recovered at a copper concentrate processing plant is used as a feedstock in the process. This material is hard to recycle in the copper smelter, due to its small size distribution and its high Sb and As levels. It can advantageously be processed elsewhere. The goal for the present example is to provide an alternative treatment for this kind of material with the present technology.

As indicated, the processing approach for copper dust can be similar to the one used for leach residue treatment and can include briquetting, smelting and gas cleaning steps.

The general description for roaster dust treatment is similar to the leach residue processing (see, e.g. FIG. 1 and Example 1).

Because the roaster dust can have a very different chemical composition than that of leach residue (high copper content without lead or bismuth), the feedstock requires different amounts of each additive in the briquetting preparation.

The main difference with leach residue processing is that it is not necessary to produce metal alloy, hence in this example only matte and slag are produced in addition to the gas phase.

Optionally, a metal or speiss layer can be formed to collect the arsenic and be processed separately. The presence of a small quantity of a metal layer (or speiss) can be used as a collector for Ag, Au and PGMs. The chemical composition of the copper dust is shown in Table 2:

TABLE 2

| Copper Dust Sample Chemical Composition | |
|---|---|
| Ag | 200-800 ppm |
| Cu | 15-25% |
| As | 3-7% |
| Sb | 0-5% |
| Fe | 5-15% |
| SiO$_2$ | 10-25% |
| S | 3-7% |

This dust, recovered form a dry electrostatic precipitator, is a very fine solid with a most of its mass contained in particles under 10 microns in diameter, hence difficult to recycle at a copper smelter.

For example, the processing line can include three areas: a handling and briquetting area, a furnace area and a gas cleaning area.

1-Handling and Briquetting Area.

Many concerns for the copper dust are similar to those for the leach residue with regard to storage and handling systems. One aspect that is more complex for the roaster dust is its physical characteristics: extra fine size distribution and very dry, which makes it prone to airborne contamination during handling. Considering the high level of arsenic, special care can be required in the design of storage and for transport systems. For example, the use of sealed or pressurized bins with pneumatic conveying can be considered.

2-Furnace Area

The smelting furnace designed for the copper dust can be similar to the leach residue smelting furnace. Fluxing parameters are, for example, tailored according to the specific chemistry of the copper dust. The thermal insulation of the bottom part of the furnace (crucible) is, for example, tailored for the materials to be contained, in this case, matte and not a lead alloy, hence having a higher melting point. In this example, three products are obtained from the furnaces: furnace slag, furnace matte (a commercial product) and process off gas. The capacity of the blast furnace can be adjusted to the quantity of copper dust available for processing.

EXAMPLE 3

Figure 5:
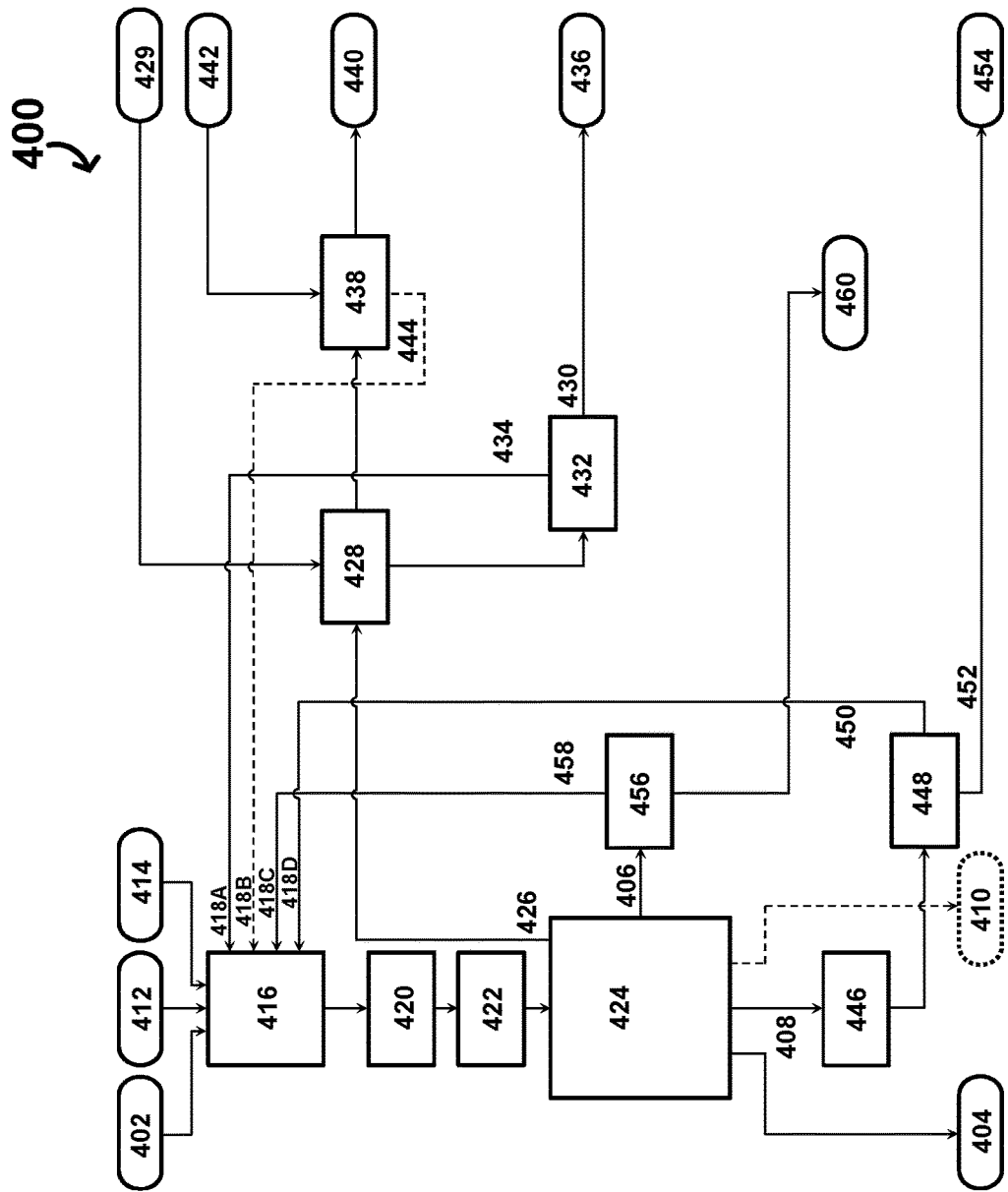
FIG. 5 shows a block diagram of another example of a process according to the present disclosure.

Another example of a process 400 is shown in FIG. 5. The process 400 can comprise treating raw material e.g. smelter dust 402 in a manner that efficiently segregates the valuable components into one of four (or five) major streams. The final product streams can be a metal 404, slag 406, matte 408, dust 434, and optionally speiss 410. The dust 402 to be processed/recycled can be mixed with fluxing agents 412 used to produce a stable slag, and optionally other additives 414 which allow the control of the segregation of elements in each of the produced streams. These materials can be blended 416 together along with any recycled streams 418A-D. Water and binding agents (not shown) can also be added to aid in agglomerating the different feed materials.

This mixture can then be sent to briquetting 420 where the material can be compacted into bricks. The bricks can be easily stored and cured to reduce their humidity content (dried) 422 prior to being fed into the furnace 424. The bricks can be fed to the furnace 424 in alternating layers with coke.

Air/oxygen can be injected at the bottom of the furnace 424. Volatiles 426 be evacuated through the off-gas flue which can be sent through two off gas treatment stages. The first washing stage 428 can be an acid washing 429. The acid wash 429 can remove particulates by entraining fines in droplets. The acid wash 429 can also partially dissolve arsenic and copper into solution. The Cu and As enriched washing solution 430 can be separated from the collected dust in solid/liquid separation 432. The solids recovered 434 can be recycled 418A to the blending stage 416 while the solution 430 can be sent for further treatment to recover copper and stabilize arsenic 436. A secondary scrubber 438 can be used to remove the remaining $SO_2$ and produce clean gas 440. An alkaline slurry 442 (ex: $Ca(OH)_2$) can be used to produce gypsum and/or $CaSO_3$. The gypsum produced 444 can be optionally recycled 418B as a fluxing agent (source of CaO and/or source of sulfur).

Once a sufficient quantity of slag, matte, and metal are produced, they can be tapped from the furnace 424. The matte 408 can be solidified 446 in a controlled manner to segregate different phases and then treated to recover any entrained metals or certain elements. For example, magnetic gravity or flotation 448 can be used wherein PbS/metal concentrate 450 can be floated from the ground matte 452 and returned to the furnace 418D. The treatment of the ground solidified matte 452 can be based on physical separation techniques such as segregation in size fractions, gravity separation techniques, flotation magnetic separation, etc. The remaining matte can be sent for further treatment to recover the contained copper 454 (smelting, leaching, etc.). The slag 406 can be post treated in a similar manner as the matte 408 to collect entrained matte and metal (controlled solidification+physical separation techniques e.g. gravity floatation 456) thereby producing slag concentrate 458 which can be recycled 418C and slag tailings 460. Optionally, process parameters can be modified to favorably produce speiss 410, a mixture of metallic arsenides and antimonides, in order to segregate key elements in this phase (Ge, Co, Ni, etc.).

It is herein disclosed, simple and efficient processes for treating dust that offer advantages over existing processes. The processes of the present disclosure can recover most copper and some of the silver in a matte while Pb, Bi, Au and the remaining silver are recovered in a metallic alloy. The matte produced from the furnace can be further processed to recover the contained Cu and Ag. The processes for recovering Cu, Ag, Au, Pb, Bi, Ge are relatively simple and present low risk. The recovery of other metals (e.g. Sb, Zn) and refined products (e.g. refined Pb, Bi, $ZnSO_4$) are also possible by aggregating other existing technologies to the present example.

EXAMPLE 4

This example relates to Ge recovery from leach residues.

Procedure and Method 200 gm dried leach residue (32% Pb, 7% Cu, 2% As, 1.4% Bi, 0.11% Ge) was mixed with a flux containing 36.2 gm $SiO_2$+38.8 gm $Ca(OH)_2$+60.4 gm $Fe_2O_3$ and 7.2 gm iron powder (to increase metallization). 19.1 gm coke (carbon) was added to the charge to act as a reductant for metal oxides. The entire charge was then placed in a blender for homogenous mixing. A MgO crucible was used for the melting which was placed in a modified muffle furnace for melting. The furnace was completely sealed and purged continuously with nitrogen gas flowing at 5 L/min to carry out the dust and smelting gas. The temperature of the furnace was raised to 1300° C. at 150° C./hr with a holding time of 30 minutes at the maximum temperature. After melting, the furnace was cooled at the same rate as heating. The furnace exhaust was connected to a scrubber which treated the harmful gases avoiding emissions to the environment.

Analysis

The melting produced slag, matte, metal and speiss were respectively 35%, 9%, 15% and 7% of the total charge weight. Weight loss due to dust and gases was 34% of the charge. During smelting, about 50% of the contained As was removed in the gas phase (as different species).

Most of the Pb and Bi (80 and 90% respectively) of the residue were recovered in the metal phase.

Approximately 70% Ge had been found in the speiss which also contained a fair portion of the arsenic. A certain volume of speiss is used to obtain the maximum amount of Ge recovery to the speiss (higher volumes generally raising the Ge recovery). The composition of the speiss also has an impact on Ge recovery, this is especially true for the Fe content of the speiss, which is related to the oxygen potential of the system (higher Fe content of the alloy giving higher Ge recoveries). With higher metallization, the speiss can also be used as an arsenic collector, leading to lower arsenic amounts to be recovered in the furnace off gas.

The mineralogy of solidified speiss showed that Ge is segregated with metallic Fe as 'FeGe' phase forming a globular shape with diameters in the range of 5-10 μm. The speiss can be used in a leach process to recover Cu, Ge and other valuable metals while stabilising the arsenic.

EXAMPLE 5

This example relates to a process for recovering various metals from copper dust with high arsenic content.

Procedure and method 200 gm dried residual filtrate (dust) was mixed with 24 gm (10.7% of dust) Cu concentrate. Then 46.3 gm flux (9.2 gm CaO+34.4 gm $Fe_2O_3$) was mixed with the dust and concentrate. The entire charge was blended together in a mixture.

Copper dust composition: 18.8% Cu, 9.7% Fe, 2.3% Sb, 6.1% As, 6.2% Al, 8.5% Si, 6.8% S.

Cu concentrate: 21.1% Cu, 37.5% Fe, 31.9% S.

The charge was mixed with water (90 ml) to make a paste. A hydraulic press was used to prepare the briquettes. The briquettes were then dried at 80° C. for 2 hr to reduce the water content (<13% humidity). The average brick density was 1.17 gm/cc. The bricks had enough porosity for gas to escape during heat up. All the briquettes were loaded in a MgO crucible with 8 gm coke (carbon) at the bottom. The crucible was placed in a modified muffle furnace with controlled atmosphere with nitrogen gas flowing at 5 L/min. The temperature of the furnace was raised to 200° C. where it was kept for 2 hr in order to evaporate all of the humidity. The temperature of the furnace was then raised to 1300° C. at 150° C./hr where it was held for 40 minutes. After melting, the temperature was gradually reduced to room temperature. The furnace exhaust was connected to a scrubber which treats harmful components prior to releasing the off gas into the environment.

Analysis

The melting produced 17% matte and 47% slag of the total charge weight. Weight loss due to dust and gases was 36%.

Most of the copper and silver were recovered to the matte. About 84% As was eliminated in this process. The matte produced from this process can be commercialised as is or could be further processed to lower its As and Sb contents.

Mineralogy of the solidified matte showed three main phases: Matrix (Cu—Fe—S), Sb—Cu compounds and $As_2Fe$ compounds, note that phase compositions are only indicative of associations in the minerals and composition may be more complex. The matrix formed showed alternated layers with high ($Cu_2S$) and lower Cu Cu—S—Fe minerals. Relatively low levels of Sb or As were found in the matrix (major Cu carriers), hence the As—Sb can technically be separated by mineral processing/hydrometallurgical techniques as they are contained in particles which can be liberated from the matrix.

As and Sb were found associated together; easing their removal from the matrix.

EXAMPLE 6

This example relates to a process for recovering various metals from a leaching residue.

Procedure and Method 250 gm dried leached residue (10% Pb, 7% Cu, 5% As, 1% Bi) was mixed with the flux [48 gm $SiO_2$+32.4 gm CaO+48.97 gm FeO(OH)]. FeO(OH) was used as a source of FeO. 6.45 gm elemental sulfur was mixed with the charge to increase the matte formation. 16 gm coke (carbon) was added to the charge, half of which was placed at the bottom of a MgO crucible and the rest mixed with the flux and dust. 6.45 gm high carbon steel pieces was placed at the bottom of the crucible to increase the metallization. The crucible was then placed in a modified muffle furnace in a sealed environment with a nitrogen gas flow of 5 L/min. The temperature of the furnace was raised to 1300° C. at 150° C./hr with a holding time of 40 minutes at the maximum temperature. After melting, the furnace was cooled at the same rate. The furnace exhaust was connected to a scrubber which treated harmful gases prior to releasing the gas into the environment.

Analysis

The melting produced slag, matte, metal and speiss as 46%, 39%, 6% and 5%, respectively of the total charge weight. Weight loss due to dust and gas was 32%. The alloy produced contained 73% Pb, 12% Bi, 5% Sb, 4% Cu and 1.3% As, with most of the Pb, Bi, Ag and Au recovered to this phase. Most of the input copper was recovered to the matte and the sulfur was found in the matte (60%) and slag (30%). Only 10% S was lost in the furnace off gas (dust+sulfur containing species).

The embodiments of the present disclosure are presented in such a manner so as to demonstrate that every combination of embodiments, when applicable, can be made. These embodiments have thus been presented in the description in a manner equivalent to making dependent claims for all of the embodiments that depend upon any of the preceding claims (covering the previously presented embodiments), thereby demonstrating that they can be combined together in all possible manners. For example, all the possible combinations, when applicable, between the embodiments of paragraphs [0009] to [00131] and the processes of paragraphs [0005] to [0008] are hereby covered by the present disclosure.

While a description was made with particular reference to the specific embodiments, it will be understood that numerous modifications thereto will appear to those skilled in the art. The scope of the claims should not be limited by specific embodiments and examples provided in the present disclosure and accompanying drawings, but should be given the broadest interpretation consistent with the disclosure as a whole.

What is claimed is:

1. A process for preparing various metals and derivatives thereof, said process comprising:
    feeding a furnace with a copper-containing material so as to volatilize at least partially at least one of arsenic and indium contained therein, thereby obtaining a material at least partially depleted in at least one of arsenic and indium; and
    feeding a melting device with said at least partially depleted material and a source of carbon in order to obtain a multi-layer product and an off gas;

wherein said obtained multi-layer product comprises:
  a first layer disposed at the top of said multi-layer product, said first layer comprising slag;
  a second layer, disposed below said first layer, and that comprises matte;
  a speiss layer disposed below said second layer; and
  optionally a bottom layer disposed below said second layer or said speiss layer and comprising an alloy of at least two metals,
wherein said process comprises at least one of
  modifying a composition of said copper-containing material before volatilizing so as to obtain a ratio 2*% S/(% Cu) of about 0.5 to about 2.0; and
  modifying a composition of said at least partially depleted material before melting so as to obtain a ratio 2*% S/(% Cu) of about 0.5 to about 2.0,
  and wherein said process comprises feeding said melting device with an iron source so as to obtain said speiss layer that comprises Fe, As and Ge, wherein said speiss layer comprises about 55% to about 90% by weight of iron.

2. The process of claim 1, wherein said source of carbon is effective for use as a reducing agent and/or for providing a thermal balance of the furnace.

3. A process for preparing various metals and derivatives thereof, said process comprising:
  feeding a blast furnace with copper-containing briquettes having a ratio (2*% S)/(% Cu) of about 0.5 to about 2.0 and a source of carbon in order to obtain a multi-layer product and an off gas; and
wherein said obtained multi-layer product comprises:
  a first layer disposed at the top of said multi-layer product, said first layer comprising slag;
  a second layer, disposed below said first layer, and that comprises matte;
  a speiss layer disposed below said second layer; and
  optionally a bottom layer disposed below said second layer or said speiss layer and comprising an alloy of at least two metals,
  wherein said process comprises controlling a sulfur content of said second layer and feeding said blast furnace with an iron source if said sulfur content is over a predetermined value, leading to a given metallization level for said second layer, wherein said speiss layer comprises about 55% to about 90% by weight of iron.

4. The process of claim 3, wherein said copper-containing briquettes comprise at least one additive chosen from a source of sulfur and a source of iron.

5. The process of claim 3, wherein said source of carbon is chosen from activated carbon, coke breeze, carbon or pet coke, diesel, natural gas and mixtures thereof.

6. The process of claim 3, wherein said process comprises feeding said blast furnace with a source of metallic iron ($Fe^0$).

7. The process of claim 3, wherein said second layer comprises a mixture of Cu—Fe—Pb—S.

8. The process of claim 3, wherein said speiss layer comprises Fe, As and Ge and wherein said process further comprises recovering Ge from said speiss layer by at least one chemical or physical technique.

9. The process of claim 3, wherein the bottom layer comprises an alloy of at least two metals chosen from Pb, Bi, Ag, Au, and Sb.

10. The process of claim 3, wherein said source of carbon is chosen from hydrocarbons.

11. A process for preparing various metals and derivatives thereof, said process comprising:
  feeding a furnace with a raw material chosen from a copper-containing material, a nickel-containing material, a cobalt-containing material and mixtures thereof so as to volatilize at least partially at least one of arsenic and indium contained therein, thereby obtaining a material at least partially depleted in at least one of arsenic and indium; and
  feeding a melting device with said at least partially depleted material and a source of carbon in order to obtain a multi-layer product and an off gas;
wherein said multi-layer obtained product comprises:
  a first layer disposed at the top of said multi-layer product, said first layer comprising slag;
  a second layer, disposed below said first layer, and that comprises matte;
  a speiss layer disposed below said second layer; and
  optionally a bottom layer disposed below said second layer or said speiss layer and comprising an alloy of at least two metals,
wherein said process comprises at least one of
  modifying a composition of said raw material before volatilizing so as to obtain a ratio % S/(% (Cu/2)+% Ni+% Co) of about 0.5 to about 2; and
  modifying a composition of said at least partially, depleted material before melting so as to obtain a ratio % S/(% (Cu/2)+% Ni+% Co) of about 0.5 to about 2,
  wherein said process comprises controlling a sulfur content of said second layer and feeding said melting device with an iron source if said sulfur content is over a predetermined value, leading to a given metallization level for said second layer, wherein said speiss layer comprises about 55% to about 90% by weight of (Fe+Ni+Co).

12. The process of claim 11, wherein said melting device is an electric furnace, a rotary furnace, a reverberatory furnace or a blast furnace.

13. The process of claim 11, wherein said source of carbon is effective for use as a reducing agent and/or for providing a thermal balance of the furnace.

14. The process of claim 11, wherein said source of carbon is chosen from activated carbon, coke breeze, carbon or pet coke, diesel and mixtures thereof.

15. The process of claim 11, wherein said process comprises feeding said furnace or said melting device with a source of metallic iron ($Fe^0$).

16. The process of claim 11, wherein said second layer comprises Cu—Ni—Co—Fe—S.

17. The process of claim 11, wherein said speiss layer comprises Fe, As and Ge and wherein said process further comprises recovering Ge from said speiss layer.

18. The process of claim 17, wherein said speiss layer comprises Cu, Ni and Co and wherein said process further comprises recovering Cu, Ni and Co from said speiss layer by at least one chemical or physical technique.

19. The process of claim 11, wherein the bottom layer comprises an alloy of at least two metals chosen from Pb, Bi, Ag, Au, Pt and Sb.

20. The process of claim 11, wherein said source of carbon is natural gas.

21. The process of claim 11, wherein said source of carbon is chosen from hydrocarbons.

22. A process for preparing various metals and derivatives thereof, said process comprising:
  feeding a furnace with a copper-containing material so as to volatilize at least partially at least one of arsenic and indium contained therein, thereby obtaining a material at least partially depleted in at least one of arsenic and indium; and feeding a melting device with said at least partially depleted material and a source of carbon in order to obtain a multi-layer product and an off gas;

wherein said obtained multi-layer product comprises:

a first layer disposed at the top of said multi-layer product, said first layer comprising slag;

a second layer, disposed below said first layer, and that comprises matte;

a speiss layer disposed below said second layer; and optionally a bottom layer disposed below said second layer or said speiss layer and comprising an alloy of at least two metals, wherein said process comprises at least one of modifying a composition of said copper-containing material before volatilizing so as to obtain a ratio 2*% S/(% Cu) of about 0.5 to about 2.0; and modifying a composition of said at least partially depleted material before melting so as to obtain a ratio 2*% S/(% Cu) of about 0.5 to about 2.0, and wherein said process comprises feeding said melting device with a source of metallic iron ($Fe^0$) so as to obtain said speiss layer that comprises Fe, As and Ge.

23. A process for preparing various metals and derivatives thereof, said process comprising:

feeding a blast furnace with copper-containing briquettes having a ratio (2*% S)/(% Cu) of about 0.5 to about 2.0 and a source of carbon in order to obtain a multi-layer product and an off gas; and wherein said multi-layer product comprises:

a first layer disposed at the top of said multi-layer product, said first layer comprising slag;

a second layer, disposed below said first layer, and that comprises matte;

a speiss layer disposed below said second layer; and optionally a bottom layer disposed below said second layer or said speiss layer and comprising an alloy of at least two metals, wherein said process comprises controlling a sulfur content of said second layer and feeding said blast furnace with a source of metallic iron ($Fe^0$) leading to a given metallization level for said second layer.

24. A process for preparing various metals and derivatives thereof, said process comprising:

feeding a furnace with a raw material chosen from a copper-containing material, a nickel-containing material, a cobalt-containing material and mixtures thereof so as to volatilize at least partially at least one of arsenic and indium contained therein, thereby obtaining a material at least partially depleted in at least one of arsenic and indium; and feeding a melting device with said at least partially depleted material and a source of carbon in order to obtain a multi-layer product and an off gas;

wherein said obtained product comprises:

a first layer disposed at the top of said multi-layer product, said first layer comprising slag;

a second layer, disposed below said first layer, and that comprises matte;

a speiss layer disposed below said second layer; and optionally a bottom layer disposed below said second layer or said speiss layer and comprising an alloy of at least two metals, wherein said process comprises at least one of modifying a composition of said raw material before volatilizing so as to obtain a ratio % S/(% (Cu/2)+% Ni+% Co) of about 0.5 to about 2; and modifying a composition of said at least partially depleted material before melting so as to obtain a ratio % S/(% (Cu/2)+% Ni+% Co) of about 0.5 to about 2, wherein said process comprises controlling a sulfur content of said second layer and feeding said melting device with a source of metallic iron ($Fe^0$), leading to a given metallization level for said second layer.

* * * * *